United States Patent

Bethel

[15] 3,662,615
[45] May 16, 1972

[54] POWER INCREASE ARRANGEMENT

[72] Inventor: Joseph H. Bethel, 221 E. Missouri St., Evansville, Ind. 47711

[22] Filed: July 15, 1970

[21] Appl. No.: 55,003

[52] U.S. Cl. ................................................................74/416
[51] Int. Cl. ............................................................F16h 1/12
[58] Field of Search ....................................................74/416

[56] References Cited

UNITED STATES PATENTS 593,702   11/1897   Thomas ..................................74/416
3,452,620   7/1969   Hughson ..............................74/416 X Primary Examiner—Leonard H. Gerin
Attorney—Warren D. Flackbert

[57] ABSTRACT

An arrangement for increasing torque, while operating at the same RPM, characterized by a drive shaft having spokes or arms disposed thereon at an angle with respect to its longitudinal axis, preferably at 45°, which mesh with gears on a driven shaft for appreciably increasing the power afforded by the driven shaft.

5 Claims, 3 Drawing Figures

INVENTOR

JOSEPH H. BETHEL

BY Warren D. Hackbert

ATTORNEY

POWER INCREASE ARRANGEMENT

As is known, the increase of resulting power while at the same operating speed is highly desirable, providing manyfold advantages, including less cost for better end results. The power increase arrangement of the invention provides such a desired objective.

In this connection, and briefly, the invention is defined by a drive shaft and a driven shaft at an angle with respect to such drive shaft. While many angular relationships may be employed, the most desirable power increase is achieved when the driven shaft is disposed at a 45° angle with respect to the drive shaft. In any event, the drive shaft includes spaced-apart spokes or arms at the aforesaid angular relationship, which arms or spokes engage the teeth on cooperating gears disposed on the driven shaft. In order to achieve proper meshing, guide members are employed to limit the lateral movement of each of the spokes or arms, where the latter are pivotally disposed within sleeves secured to the drive shaft.

The invention has many end uses and can serve to function wherever it is desired to have a substantial power increase based on any given rotational speed. By way of example, when the invention is utilized to operate any given mechanism, at the aforesaid preferred 45° angle, a 100 pound torque force on the drive shaft creates a 143 pound torque force on the driven shaft.

Figure 1:
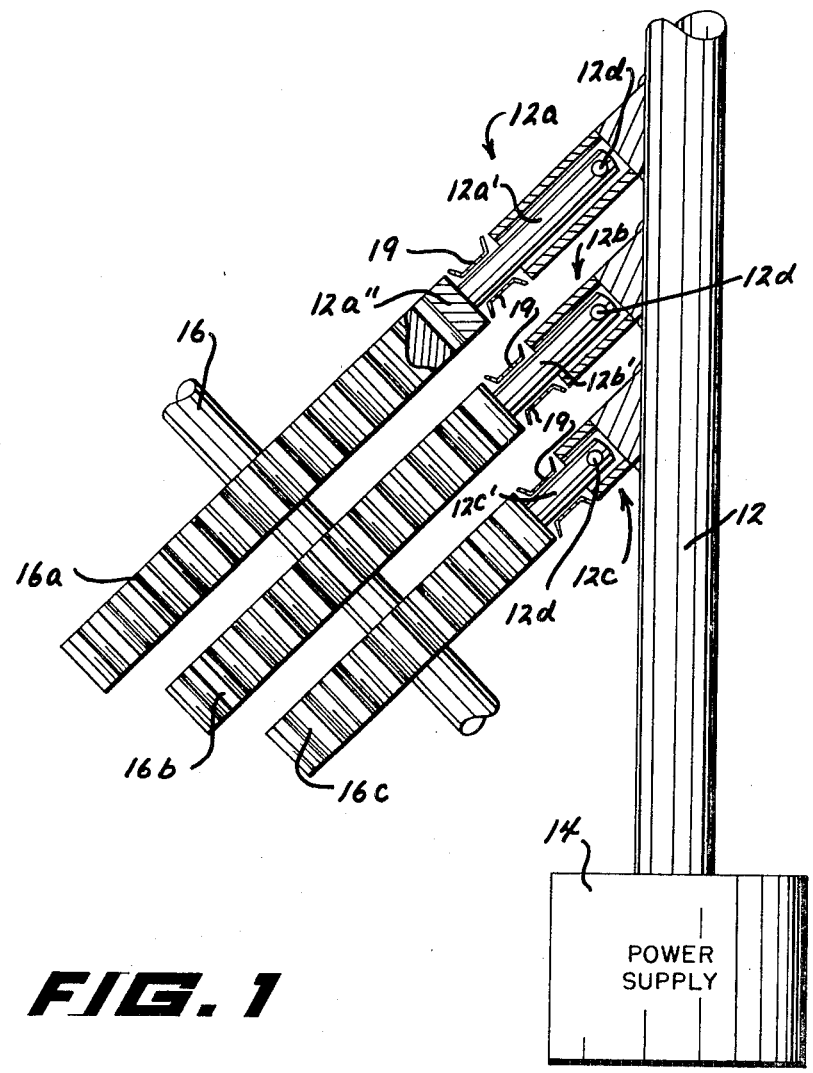
Figure 2:
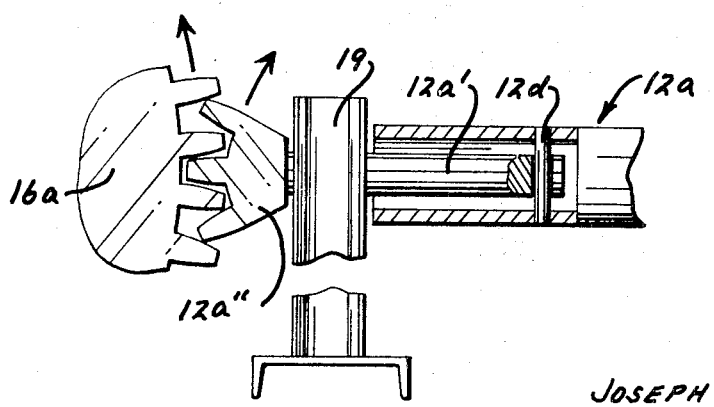
Figure 3:
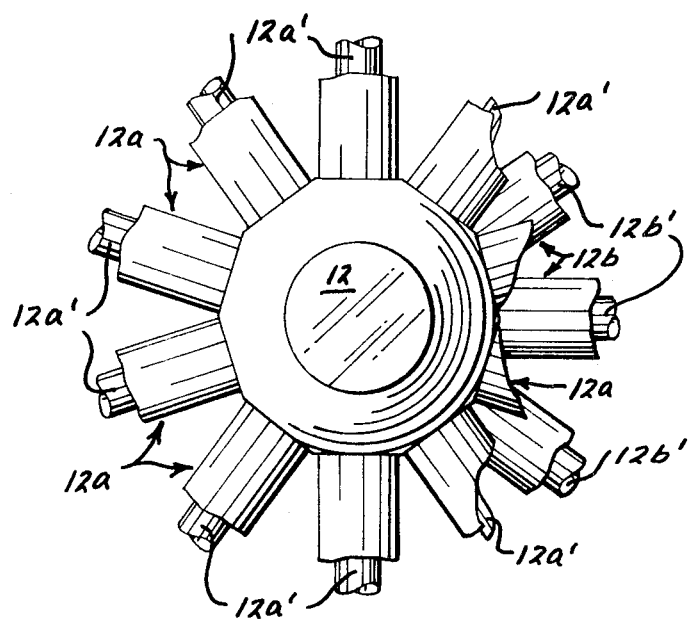

A better understanding of the invention will become more apparent from the following description, taken in conjunction with the accompanying drawings, wherein FIG. 1 is a top plan view of the invention, showing only three spokes or arms for clarity of presentation;

FIG. 2 is a detailed fragmentary view of a single spoke or arm, as shown in FIG. 1; and, FIG. 3 is a view in end elevation, partly in section and looking down the drive shaft towards the power supply of FIG. 1, showing details of the first and part of the second operating rows of spokes or arms, affording more detail to the showing of such figure.

For the purposes of promoting a better understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, a drive shaft 12 is driven from a conventional power supply 14, such as a motor, for example. In the drawing, three groupings of spokes or arms are disclosed, i.e. spoke grouping 12a, spoke grouping 12b and spoke grouping 12c. As a matter of orientation, and for the example described herein, 10 spokes make up each of the spoke groupings.

In any event, spokes 12a', 12b' and 12c' in each spoke grouping 12a, 12b and 12c, respectively, are disposed at an angle of 45° with respect to the longitudinal axis of the drive shaft 12. As more particularly seen in FIGS. 1 and 2, the aforesaid spokes are respectively mounted within hollow casings forming part of an inner frame secured to drive shaft 12, being pivotal laterally at 12d to assure proper meshing, at 12a'', for the spokes 12a' of gearing grouping 12a (see FIGS. 1 and 2), with teeth on gears 16a, 16b and 16c, to be discussed herebelow.

In the illustration herein, a driven shaft 16 is disposed at an angle of 45° with respect to the drive shaft 12. The driven shaft 16 has the aforementioned gears 16a, 16b and 16c disposed thereon, where the radius of each gear equals the length of its corresponding meshing spoke. In order to achieve proper meshing, a guide member 19 is employed on either side of the pivotal spokes 12a', 12b' and 12c'. It should be understood that spoke grouping 12a, spoke grouping 12b and spoke grouping 12c are respectively 120° out-of-phase.

The system provides a mechanical unbalance, resulting in the desired increase in power. When the power source 14 is energized, the drive shaft 12, with associated spoke groupings 12a, 12b and 12c, rotate. The individual spokes 12a', 12b' and 12c', in each grouping, mesh with teeth on corresponding gears 16a, 16b and 16c on driven shaft 16. By angling the spoke groupings, with respect to the drive shaft 12, an increase in power occurs because of the shorter distance involved from the drive shaft 12 to the position where the spokes and gears mesh, such being in contrast to where the spokes or arms are normal with respect to the drive shaft 12. As stated, it should be understood that other than the illustrated 45° angle may be employed, even a small angular deviation providing power increase.

From the preceding, it should be understood that the invention has provided an important contribution to power increasing techniques, and one which should serve a solid basis for many industrial applications. The illustrated device is susceptible to various changes, as, for example, more or less individual spokes or arms may be employed, more or less spoke groupings may be employed, and/or proportioning varied, and, accordingly, the preceding description should be considered illustrative, and not as limiting the scope of the following claims:

I claim:

1. A torque increase arrangement comprising a drive shaft and a driven shaft, and spokes on said drive shaft and at least one cooperating gear on said driven shaft for effecting the driving of said driven shaft with increased torque, said driven shaft being disposed at an angle with respect to the axis of said drive shaft.

2. The torque increase arrangement of claim 1 where said driven shaft is at a 45° angle with respect to the axis of said drive shaft.

3. The torque increase arrangement of claim 1 where said spokes are disposed at a 45° angle with respect to a lateral plane through said drive shaft.

4. The torque increase arrangement of claim 1 where a plurality of spokes in various groupings cooperate with a plurality of gears.

5. The torque increase arrangement of claim 4 where said groupings of spokes are in an out-of-phase relationship with each other.

* * * * *